Aug. 14, 1923.
J. C. PARKER
1,465,089
DISK ATTACHMENT FOR GARDEN RAKES
Filed July 25, 1922
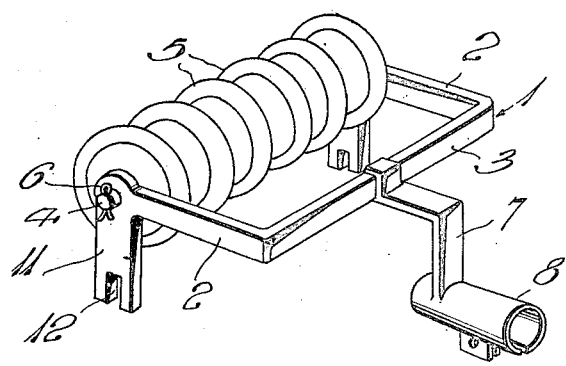
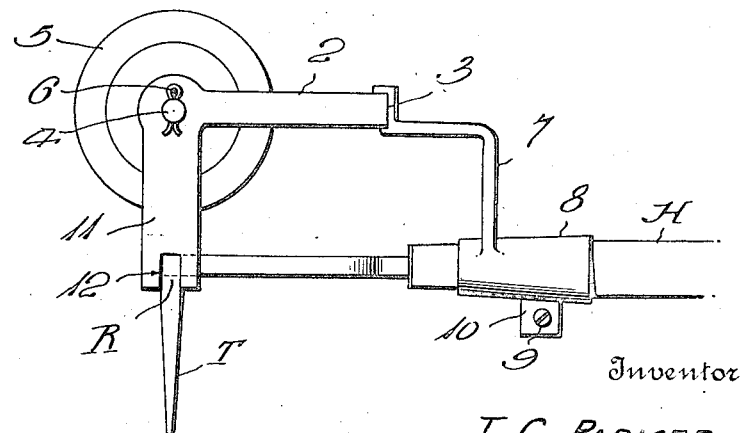
Witness
H. Woodard
Inventor
J. C. PARKER
Attorneys Patented Aug. 14, 1923.

1,465,089

UNITED STATES PATENT OFFICE.

JOHN C. PARKER, OF OMAHA, NEBRASKA.

DISK ATTACHMENT FOR GARDEN RAKES.

Application filed July 25, 1922. Serial No. 577,337.

*To all whom it may concern:*

Be it known that I, JOHN C. PARKER, a citizen of the United States, residing at Omaha, in the county of Douglas and State of Nebraska, have invented certain new and useful Improvements in Disk Attachments for Garden Rakes; and I do declare the following to be a full, clear, and exact description of the invention, such as will enable others skilled in the art to which it appertains, to make and use the same.

This invention relates generally to garden implements, and particularly to attachments for garden rakes.

The invention has been designed in order to provide a set of soil pulverizing disks embodied in a garden rake attachment capable of being quickly and easily applied to an ordinary garden rake and also of being quickly and easily removed therefrom.

The improved attachment is of strong and durable construction but at the same time it is of simple construction so that it can be very cheaply and economically made.

The novelty in the invention resides in the various details of construction and the combination and arrangement of parts, which are hereinafter fully described and claimed and shown in the accompanying drawing.

In the accompanying drawing which forms a part of this specification:—

Fig. 1 is a perspective view of a garden rake attachment constructed according to the principles of the present invention; and Fig. 2 is a side elevation of the improved attachment illustrating it applied to an ordinary garden rake.

A garden rake attachment constructed according to the principles of the invention may comprise a substantially U-shaped frame 1 having a pair of spaced parallel arms 2 integrally connected at one of their ends by a cross bar 3 and having apertures formed in their other ends to receive a shaft 4, upon which is mounted a set of soil pulverizing disks 5. The disks 5 are preferably revolubly mounted upon the shaft 4, and the latter is held against longitudinal shifting by means of cotter pins 6 which are disposed in apertures extending transversely through the shaft 4 at its extreme end portions.

The frame 1 is provided with means for attachment to an ordinary garden rake, and this means preferably consists of a right angular bracket 7 fastened in any suitable manner at one end to the intermediate portion of the bar 3 and provided at its other end with a substantially tubular split clamp 8. The clamp 8 is designed to fit around the handle H of an ordinary garden rake and is provided with a screw 9 operating in openings in a pair of ears 10 in order to provide a means for tightening the clamp around the handle H.

In addition to the clamp 8, the frame 1 is provided with means for bracing it by the head R of the rake and maintaining the disks 5 out of contact therewith. This means preferably comprises arms 11 which extend at right angles from the free ends of the hereinbefore described arms 2. The arms 11 are longer than the radii of the disks 5 and at their free ends they are provided with notches 12 designed to receive the bar of the head of the rake which carries the rake teeth T.

The clamp 8 is preferably constructed of spring metal and may be inserted upon the handle H of the rake by springing it open, or it may be placed upon the handle H by inserting the free end of the handle therein and sliding it longitudinally. After the handle H is properly inserted in the clamp 8 and the bar of the rake head which carries the rake teeth is inserted in the notches 12 the screw 9 may be tightened so as to tighten the clamp 8.

When the attachment is placed in this manner upon a rake, the disks 5 may be used to pulverize the soil, but since the disks 5 do not interfere with the rake teeth T, the latter may also be used without removing the attachment from the rake.

From the foregoing description, taken in connection with the accompanying drawing, the construction, use, and advantages of the invention will be readily understood, without further explanation.

It is obvious that various changes in form, proportion, and in the minor details of construction may be resorted to without departing from the principles of the invention or sacrificing any of the advantages thereof, and hence it is to be understood that such changes may be made within the meaning and scope of the appended claims which define the patentable novelty in the invention.

What is claimed is:

1. A garden rake attachment comprising a frame, a set of soil pulverizing disks revolubly mounted upon said frame, a clamp fixed to said frame and adapted to engage the handle of a garden rake, and a brace fixed to said frame and engageable with the head of the rake to brace said frame by the latter and to maintain said set of disks out of contact therewith.

2. An attachment for garden rakes comprising a U-shaped frame, a set of soil pulverizing disks revolubly mounted between the free ends of the arms of said frame, a bracket fixed to the cross bar of said frame and carrying a clamp adapted to engage the handle of a garden rake, and braces fixed to said frame and engageable with the head of the rake to brace said frame from the latter.

3. An attachment for garden rakes comprising a U-shaped frame, a set of soil pulverizing disks revolubly mounted between the free ends of the arms of said frame, a bracket fixed to the cross bar of said frame and carrying a clamp adapted for engagement with the handle of a garden rake, and braces extending downwardly from the free ends of the arms of said frame and provided at their free ends with notches adapted to receive the cross bar of the head of the garden rake.

In testimony whereof I have hereunto affixed my signature.

JOHN C. PARKER.